United States Patent [19]

Becker, Jr. et al.

[11] Patent Number: 4,996,525
[45] Date of Patent: Feb. 26, 1991

[54] R. F. LOCKOUT CIRCUIT FOR ELECTRONIC LOCKING SYSTEM

[75] Inventors: Earl M. Becker, Jr., Camarillo; Allen Miller, Oxnard, both of Calif.

[73] Assignee: The United States of America as represented by the Secretary of the Navy, Washington, D.C.

[21] Appl. No.: 440,950

[22] Filed: Nov. 24, 1989

[51] Int. Cl.$^5$ ........................ H04Q 1/00; G06F 15/20
[52] U.S. Cl. ............................ 340/825.31; 340/825.3; 340/825.72; 361/172
[58] Field of Search ........... 340/825.31, 825.3, 825.72, 340/825.69; 361/170–172, 182–184, 193, 197; 455/58, 134; 70/278

[56] References Cited

U.S. PATENT DOCUMENTS

| 2,787,731 | 4/1957 | Wetzger | 361/193 |
| 2,909,769 | 10/1959 | Spaulding | 340/340 |
| 3,564,501 | 2/1971 | Flook, Jr. | 340/825.31 |
| 3,621,335 | 11/1971 | Coleman | 340/163 |
| 3,671,816 | 6/1972 | Ritzow | 361/193 |
| 3,851,227 | 11/1974 | Hedin | 361/172 |
| 4,196,347 | 5/1980 | Hadley | 455/603 |
| 4,408,251 | 10/1983 | Kaplan | 361/172 |
| 4,621,258 | 11/1986 | Campman | 340/567 |
| 4,744,021 | 5/1988 | Kristy | 340/825.31 X |

Primary Examiner—Donald J. Yusko
Assistant Examiner—Edwin C. Holloway, III
Attorney, Agent, or Firm—David S. Kalmbaugh

[57] ABSTRACT

An electronics lockout circuit including an antenna adapted to receive radio frequency signals from a transmitter, and a radio frequency detector circuit which converts the radio frequency signals into a first direct current voltage indicative of the relative strength of the field resulting from the radio frequency signals. The first direct current voltage is supplied to a trigger circuit which compares this direct current voltage to an adjustable direct current reference voltage and provides a second direct current voltage at the output thereof whenever the amplitude of the first direct current voltage exceeds the amplitude of the reference voltage. The second direct current voltage provided by the comparator circuit is supplied to a disconnect relay circuit which upon receiving a signal from the electronic control unit of an electronic combination lock during the time period the second direct current voltage is present isolates the door strike coil of a security door from the electronic control unit. This prevents signals falsely generated by the electronic control unit because of radio frequency signals in the vicinity of the electronic control unit from energizing the door strike coil and thereby accidentally opening a security door.

14 Claims, 2 Drawing Sheets

R. F. LOCKOUT CIRCUIT FOR ELECTRONIC LOCKING SYSTEM

BACKGROUND OF THE INVENTION

1. Field of the Invention

This invention relates generally to electronic combination locks for security doors and the like. In particular, this invention relates to an electronic lockout circuit which prevents a radio frequency signal from falsely activating an electronic combination lock and thereby opening a security door.

2. Description of the Prior Art

Electronic combination locks and electronic locking systems are used on security doors to prevent unauthorized access through the doorway. An electronic lock system generally includes a code entry switch module mounted with the module's switches accessible from a nonsecured area, an electrically activated door strike mounted in a security door frame, and an electronic control unit mounted in a controlled space and which monitors the code entry switches and activates the door strike when a user specific combination is provided through the code entry switches.

Under normal circumstances these prior art electronic combination locks and electronic locking systems function effectively in allowing only authorized persons with an assigned access code to gain entry into a secured area. However, where there is radio transmitter equipment in the vicinity of an electronic combination lock, the electronic control unit may respond to the radio frequency signals generated by the transmitter and provides an electrical signal to the door strike activating the door strike which opens the security door, thereby allowing unauthorized access to the secured area.

With this and other disadvantages known to prior art electronic combination locks the present invention was conceived and one of its objects is to provide an electronics circuit which may be used to prevent radio frequency signals from falsely unlocking security doors that have electronic locking systems.

It is another object of the invention to provide an electronics circuit which may be easily adapted to conventional as well as state of the art electronic combination locks to prevent the accidental opening of a security door by a radio frequency transmitter.

It is still another object of the invention to provide a relatively simple and inexpensive electronics circuit which prevents the accidental activation of an electronic combination lock by a radio frequency transmitter.

Various other advantages and objects of the present invention will become apparent to those skilled in the art as a more detailed description of the invention is set forth below.

SUMMARY OF THE INVENTION

The objects of the present invention are satisfied by an electronics circuit which includes an antenna adapted to receive radio frequency signals from a transmitter, and a radio frequency detector circuit which converts the radio frequency signals into a first direct current voltage indicative of the relative strength of the field resulting from the radio frequency signals. The first direct current voltage is supplied to a trigger circuit which compares this direct current voltage to an adjustable direct current reference voltage and provides a second direct current voltage at the output thereof whenever the amplitude of the first direct current voltage exceeds the amplitude of the reference voltage.

The second direct current voltage provided by the comparator circuit is supplied to a disconnect relay circuit which upon receiving a signal from the electronic control unit of an electronic combination lock during the time period the second direct current voltage is present isolates the door strike coil from the electronic control unit. This prevents signals falsely generated by the electronic control unit because of radio frequency signals in the vicinity of the electronic control unit from energizing the door strike coil and thereby accidentally opening a security door.

DESCRIPTION OF THE PREFERRED EMBODIMENT

Figure 1:
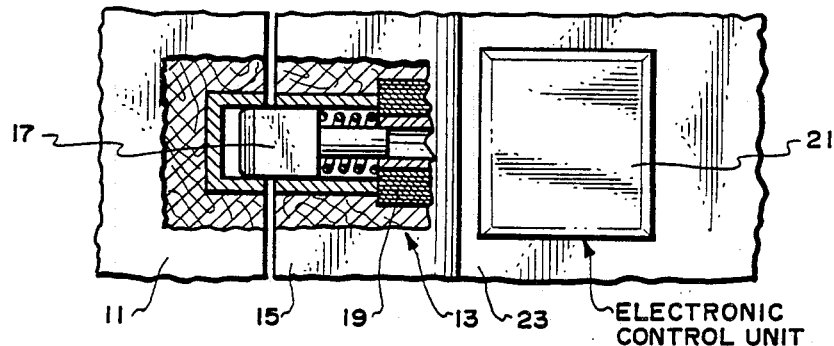
FIG. 1 is a sectional view in plan of a security door and an electronic control unit which includes the radio frequency lockout circuit of the present invention.
Figure 2:
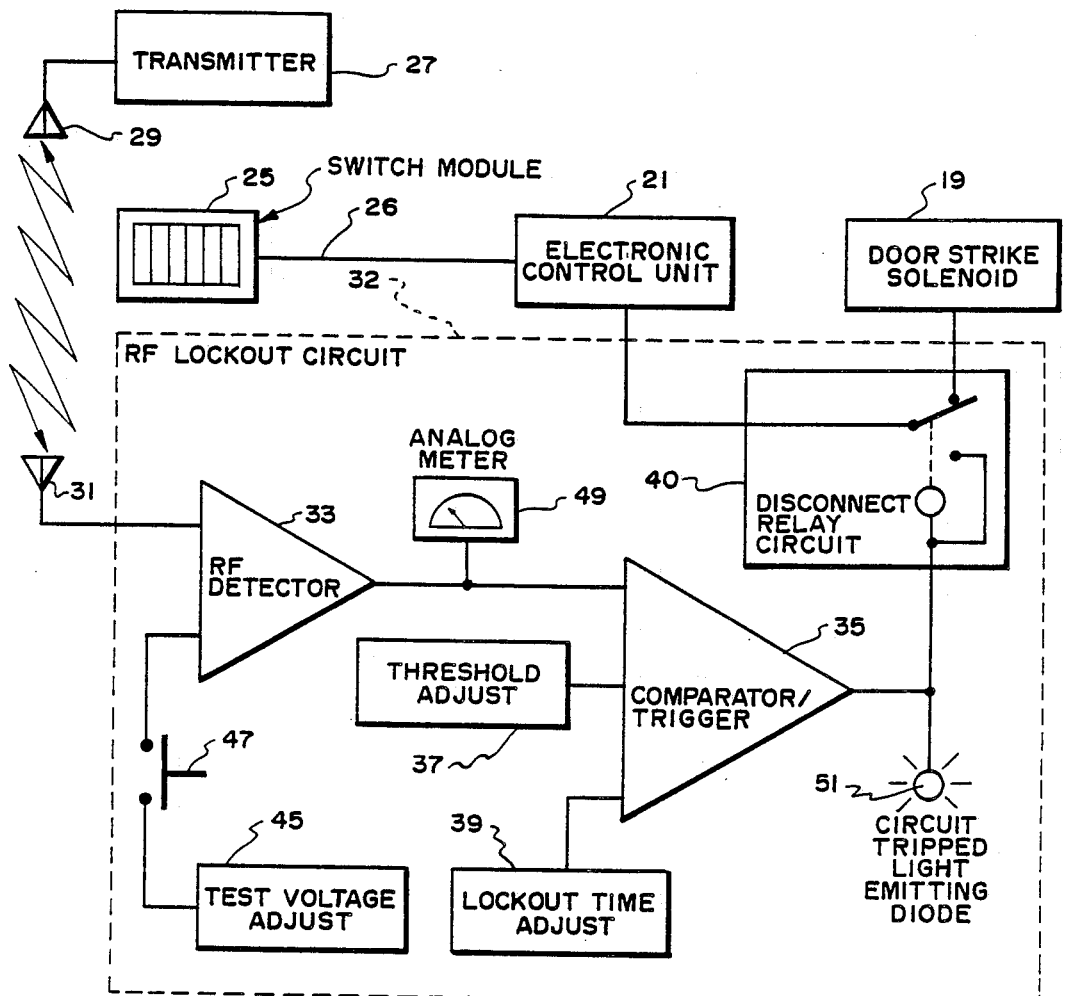
FIG. 2 is a schematic diagram illustrating the radio frequency lockout circuit constituting the present invention.

Referring first to FIGS. 1 and 2 there is shown a security door 11 which is fitted with a door strike 13 mounted within a door frame 15. Door strike 13 includes a spring activated bolt 17, which, as illustrated serves to lock security door 11 closed and which may be withdrawn to release security door 11 by electrical energized of a door strike solenoid 19. Energization of solenoid 19 is by an electronic control unit 21, mounted on a wall 23 adjacent door frame 15 within a secured area.

There is mounted on a wall, not shown, in a non-secured area a code entry switch module 25 which is connected by wire 26 to control unit 21. Module 25 allows persons with an assigned four or five digit access code which when entered into switch module 25 activates electronic control unit 21 which, in turn, energizes solenoid 19 withdrawing bolt 17 which allows security door 11 to be opened.

Referring now to FIG. 2, there is shown a transmitter 27 which includes an antenna 29 and is located near switch module 25. When transmitter 27 sends radio frequency signals to a remote receiver, not shown, wire 26 functions like an antenna, receiving the transmitted signals which are provided to electronic control unit 21. The transmitted signals may activate electronic control unit 21, causing electronic control unit 21 to produce at the output thereof a false signal which energizes door strike solenoid 19. Activation of door strike solenoid 19 by the false signal produced by electronic control unit 21 withdraws bolt 17 opening security door 11 which allows unauthorized access to the secured area.

Referring again to FIG. 2 there is shown a radio frequency lockout circuit 32 which prevents the false signals produced by electronic control unit 21 from opening security door 11.

The radio frequency signals transmitted by antenna 29 are also received by an antenna 31 and provided to a radio frequency lockout circuit 32 which includes a radio frequency detector 33 having a first input connected to antenna 31.

Detector 33 converts the radio frequency signals to a first direct current voltage having an amplitude proportional to and indicative of the field strength of the radio frequency signals in the vicinity of antenna 31 transmitted by antenna 29.

The output of detector 33 is connected to the first input of a comparator/trigger 35, which has connected to the second input thereof a direct current threshold adjust circuit 37, and which has connected to the third input thereof a lockout time adjust circuit 39.

Comparator/trigger 35 compares the first direct current voltage with a reference direct current voltage provided by threshold adjust circuit 37 and produces a second direct current voltage at the output thereof whenever the amplitude of the first direct current voltage exceeds that of the reference voltage.

The second direct current voltage is supplied to the input of a disconnect relay circuit 40 which is connected to the output of comparator/trigger 35.

Figure 3:
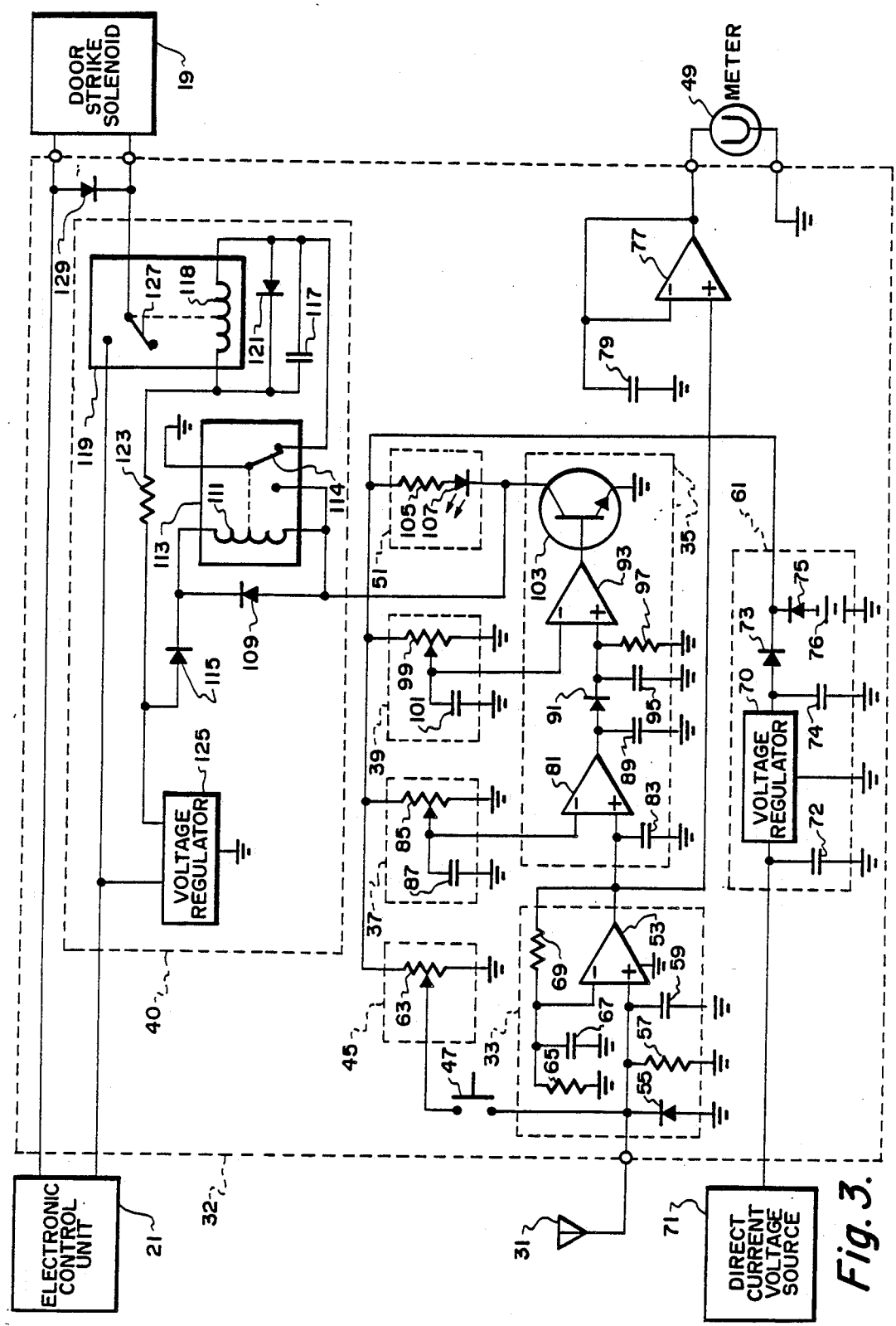
FIG. 3 is a detailed schematic diagram of the radio frequency lockout circuit of FIG. 1.

At is best illustrated in FIG. 3, disconnect relay circuit 40 of radio frequency lockout circuit 32 includes a pair of relays 113 and 119 which function in combination to prevent a signal falsely generated by electronic control unit 21 from activating door strike solenoid 19.

During the time period the second direct current voltage is present at the input of disconnect relay circuit 40, a signal provided by electronic control unit 21 will isolate the output of electronics control unit 21 from the input of door strike solenoid 19, thereby preventing a signal which is falsely generated by electronic control unit 21 from activating door strike solenoid 19. Lockout time adjust circuit 39 supplies a delay signal to comparator/trigger 35 causing comparator/trigger 35 to continue to provide to the input of disconnect relay circuit 40 the second direct current voltage for approximately three to five seconds after the amplitude of the first direct current voltage drops below the reference direct current voltage. This, in turn, provides a safety factor allowing electronic control unit to recover from strong radio frequency fields before the door strike solenoid 19 may be actuated.

At this time it should be noted that radio frequency lockout circuit 30 includes a test voltage adjust circuit 45 connected through a normally open push button switch 47 to the second input of detector 33, an analog meter 49 connected between the output of detector 33 and the first input of comparator/trigger 35 and a circuit trip indicator light emitting diode 51 connected to the output of comparator/trigger 35.

Activation of push button switch 47 provides a test voltage which is used in adjusting radio frequency lockout circuit 32 during initial setup and for verification of circuit operation. Analog meter 49 indicates the strength of the radio frequency field caused nearby radio frequency signals, while light 51 indicates that radio frequency lockout circuit 32 is activated preventing security door 11 from accidently being opened.

Referring now to FIG. 3 antenna 31 is connected to the positive input of an operational amplifier 53 and the parallel combination of a diode 55, a resistor 57, and a capacitor 59, with the anode of diode 55 being connected to ground and the cathode of diode 55 being connected to the positive input of amplifier 53. A positive direct current voltage circuit 61 is also connected through a variable resistor 63 and push button 47 to the positive input of operational amplifier 53. Connected to the negative input of amplifier 53 is the parallel combination of a resistor 65 and capacitor 67, while there is connected between the negative and output of amplifier 53 a resistor 69.

Direct current voltage source 61 includes a voltage regulator 70 the input of which is connected to an external source of direct current voltage 71 and a capacitor 72. The output of regulator 70 is connected to the anode of a diode 73 and a capacitor 74. The cathode of diode 73 is connected to cathode of a diode 75, the anode of which is connected to the positive terminal of a battery 76, while the negative terminal of battery 76 is connected to ground.

There is connected to the output of amplifier 53 the positive input of an operational amplifier 77, while the negative input and the output of amplifier 77 are connected to a capacitor 79. The output of amplifier 77 is also connected to analog meter 49.

The output of amplifier 53 is connected to the positive input of an operational amplifier 81. There is also connected to the positive input of amplifier 81 a capacitor 83. Direct current voltage source 61 is connected through a variable resistor 85 to the negative input of operational amplifier 81. A capacitor 87 is also connected to the negative input of amplifier 81. Connected to the output of amplifier 81 is the anode of a diode 91 and a capacitor 89. The cathode of diode 91 is connected to the positive input of an operational amplifier 93, and the parallel combination of a capacitor 95 and a resistor 97. Direct current voltage source 61 is connected through a variable resistor 99 to the negative input of amplifier 93. There is also connected to the negative input of amplifier 93 a capacitor 101.

The output of amplifier 93 is connected to the base of a transistor 103, while the emitter of transistor 103 is connected to ground, and the collector of transistor 103 is connected through a resistor 105 and a light emitting diode 107 to voltage source 61.

The collector of transistor 103 is also connected to the anode of a diode 109, one end of the coil 111 of relay 113, and the normally open terminal of a contact 114 of relay 113. The cathode of diode 109 is connected to the cathode of a diode 115, and the opposite end of coil 111.

The common terminal of contact 114 is connected to ground, while the normally closed terminal of contact 114 is connected to the parallel combination of a capacitor 117, the coil 118 of a relay 119, and a diode 121, the anode of which is connected to the normally closed terminal of contact 114 and the cathode of which is connected through a resistor 123 to the anode of diode 115 and the output of a voltage regulator 125. The input of voltage regulator 125 is, in turn, connected to the positive terminal of electronic control unit 21, and the normally open terminal of a contact 127 of relay 119. The common terminal of contact 127 is connected to the first terminal of door strike solenoid 19 and the cathode of a diode 129. The anode of diode 129 is, in turn, connected to the second terminal of door strike solenoid 19 and the negative terminal of electronic control unit 21.

The operation of radio frequency lockout circuit 32 will now be discussed in conjunction with FIG. 3 of the drawings.

Source 71 supplies to voltage regulator 70 a direct current voltage of between 7 and 35 volts which is converted to approximately 5 volts D.C. by voltage regulator 70, then reduced to 4.3 volts D.C. by diode 73, and supplied to variable resistors 63, 85 and 99 and resistor 105. Capacitors 72 and 74 function as filters to reduce the effect of transient fluctuations in the supply voltage provided by circuit 61. Battery 76 provides a backup source of supply voltage whenever the direct current voltage provided by source 71 is interrupted. Diode 75 prevents the 5 volts D.C. provided by regulator 70 from over charging battery 76, while diode 73 prevents battery 76 from feeding current through voltage regulator 70 when regulator 70 is off.

When there are no radio frequency signals present in the vicinity of security door 11, FIG. 1, electronic lockout circuit 32 will not interrupt a signal provided by electronic control unit 21 to activate door strike solenoid 19. The signal provided by electronic control unit 21 is normally between 6 and 35 volts D.C. to accommodate different models of door strikes. This signal is reduced to approximately 5 volts D.C. by voltage regulator 125 so as to allow the 5 volts D.C. to energize coils 111 and 118, and also allow the 6 to 35 D.C. to energize door strike 19 opening security door 11, FIG. 1. When the current to the coil of door strike solenoid 19 is switched off, diode 129 becomes forward biased providing a current path through which the inductive buildup of voltage within the coil of solenoid 19 may dissipate thereby preventing damage to the electronic components of circuit 32.

When there are radio frequency signals present in the vicinity of security door 11, FIG. 1, antenna 31 receives the radio frequency signals, which are rectified to a first direct current voltage by the circuit combination diode 55, resistor 57, and capacitor 59, with the level of the first direct current voltage being proportional to the strength of the radio frequency energy received by antenna 31. The first direct current voltage is then amplified and buffered by the circuit combination of amplifier 53, and resistors 65 and 69, with capacitor 67 being used to reduce the effect of A.C. pickup at the output of operational amplifier 53.

The amplified first direct current voltage is supplied to the positive inputs of operational amplifiers 77 and 81. Operational amplifier 77 is connected as a follower circuit buffering the amplified direct current voltage which is then supplied to meter 49. Meter 49, in turn, provides a visual indication of the strength of a radio frequency field within the vicinity of security door 11, FIG. 1. Capacitor 79 is used to reduce the effect of A.C. pickup at the output of amplifier 77.

Operational amplifier 81 compares the first direct current voltage supplied to the positive input thereof with a reference direct current voltage supplied by variable resistor 85 and which is adjustable between 0 and 4.3 volts D.C. by the slider of variable resistor 85. When the voltage at the positive input of amplifier 81 exceeds the voltage at the negative input of amplifier 81 the output of amplifier changes from a low state of 0 volts D.C. to a high of approximately 4.3 volts D.C. Variable resistor 85 is normally set such that amplifier 81 only provides a high at the output thereof when the radio frequency field strength is approximately 5 volts per meter or greater. Capacitors 83, 87 and 89 are used to reduce the effect of A.C. pickup on amplifier 81.

Diode 91 allows capacitor 95 to charge when the output of amplifier 81 is high and prevents capacitor 95 from discharging through amplifier 81 when the output of amplifier 81 is low.

Capacitor 95 and resistor 97 form an RC circuit which provides a second direct current voltage to the positive input of operational amplifier 93. This second direct current voltage decays exponentially after the output of operational amplifier 81 goes from a high to low state.

Amplifier 93 compares the second direct current voltage with a reference direct current voltage supplied to the negative input thereof by variable resistor 99. When the voltage at the positive input of amplifier 93 exceeds the voltage at the negative input of amplifier 93 the output goes high switching on transistor 103. The voltage at the negative input of amplifier 93 may be set between 0 and 4.3 volts D.C. by positioning the slider of variable resistor 99. This adjustment is referred to as a lockout time adjustment which provides a delay of between 3 to 5 seconds allowing electronic control unit 21 to recover from strong radio fields before door strike solenoid 19 can be actuated. Capacitor 101 reduces the effect of A.C. pickup.

When transistor 103 is switched on current flows through light emitting diode 107 which provides a visual indication of a strong radio frequency field in the vicinity of security door 11, FIG. 1.

Energizing coil 111 closes contact 114 providing a connection to ground that maintains relay 113 in an activated state until the signal from electronic control unit 21 terminates.

When transistor 103 is switched on there is current path through diode 115, coil 111 and the collector to emitter of transistor 103 to ground allowing a signal falsely generated by electronic control unit 21 to energize coil 111.

Energizing coil 111 opens contact 114 which is normally closed breaking the current path for relay 119 preventing door strike solenoid 19 from operating.

Resistor 123, capacitor 117 and the coil 118 of relay 119 form a time delay circuit which eliminates a race condition between relays 113 and 119, thereby insuring that contact 127 of relay 119 does not close when relay 113 is energized.

Diodes 109 and 121 respectively function the same as diode 129 by becoming forward biased to provide a current path through which the inductive buildup of voltage within coils 111 and 118 may dissipate when the current to coils 111 and 118 is switched off.

Diode 115 allows current to flow through coil 111 of relay 114, but prevents current flow from light emitting diode 107 through diode 109, coil 111, resistor 123 coil 118 and contacts 114 to ground.

At this time it should be noted that variable resistor 63 supplies a direct current voltage to push button 47 which may be varied between 0 and 4.3 volts D.C., and which when push button 47 is engaged provides for the testing of lockout circuit 32.

From the foregoing description, it may readily be seen that the subject invention comprises a new, unique, and exceedingly useful electronic lockout circuit which constitutes a considerable improvement over the prior art. Obviously, many modifications and variations of the present invention are possible in light of the above teachings. It is, therefore, to be understood that within the scope of the appended claims, the invention may be practiced otherwise than as specifically described.

What is claimed is:

1. An electronic circuit for preventing a door strike solenoid connected to an electronic control unit from being falsely energized by an electrical signal supplied thereto by said electronic control unit, said electronic control unit supplying said electrical signal in response to radio frequency signals generated by a transmitter located near said electronic control unit, said electronic control unit comprising:

means for receiving the radio frequency signals generated by said transmitter;

detector circuit means having an input connected to said receiving means and an output for converting said radio frequency signals to a first direct current voltage having an amplitude indicative of the field strength of said radio frequency signals;

means having an output for generating a reference direct current voltage;

trigger circuit means having a first input connected to the output of said detector circuit means, a second input connected to the output of said generating means and an output for producing a second direct current voltage when the amplitude of said first direct current voltage exceeds said reference direct current voltage;

a switching transistor having a base connected to the output of said trigger circuit means, an emitter connected to ground and a collector;

relay circuit means having a normally closed contact connected between said electronic control unit and said door strike solenoid and a coil with one end of said coil being connected to the collector of said switching transistor and the opposite end of said coil being connected to said electronic control unit, the coil of said relay circuit means being energized by the electrical signal from said electronic control unit when said switching transistor is turned on by the second direct current voltage from said trigger circuit means, the normally closed contact of said relay circuit means being opened by said energized coil thereby preventing the electrical signal supplied by said electronic control unit from falsely energizing said door strike solenoid.

2. The electronic circuit of claim 1 wherein said receiving means comprises an antenna.

3. The electronic circuit of claim 1 wherein said detector circuit means comprises:

an operational amplifier having an input; and the parallel combination of a first resistor, a first capacitor, and a first diode connected between ground and the input of said operational amplifier;

said first diode having a cathode connected to the input of said operational amplifier and an anode connected to ground.

4. The electronic circuit of claim 1 wherein said trigger circuit means comprises:

a first operational amplifier having a positive input connected to the output of said detector circuit means and a negative input;

a direct current voltage source having an output connected to the negative input of said first operational amplifier;

a diode having an anode connected to the output of said first operational amplifier and a cathode;

a second operational amplifier having a positive input connected to the cathode of said diode, a negative input connected to said voltage source and an output connected to the base of said switching transistor;

a variable resistor connected between the negative input of said second operational amplifier and the output of said voltage source; and the parallel combination of a resistor and a capacitor connected between ground and the positive input of said second operational amplifier.

5. The electronic circuit of claim 4 further characterized by a light emitting diode connected between the output of said voltage source and the collector of said switching transistor.

6. The electronic circuit of claim 1 wherein said relay circuit means comprises:

a first relay having a normally closed contact and a coil with one end of said coil being connected to the collector of said switching transistor;

the contact of said first relay having a common terminal connected to ground, a normally open terminal connected to the collector of said switching transistor and a normally closed terminal;

a diode having a cathode connected to the opposite end of the coil of said first relay and an anode;

a voltage regulator having an input connected to the output of said electronic unit and an output connected to the anode of said diode;

a second relay having a normally open contact and a coil with one end of said coil being connected to the normally closed terminal of said first relay and the opposite end of said coil being connected to the output of said voltage regulator; and the contact of said second relay having a common terminal connected to the input of said door strike solenoid and a normally open terminal connected to the output of said electronic control unit.

7. The electronic circuit of claim 1 further characterized by an analog meter connected to the output of said detector circuit means.

8. An electronic circuit for use with an electronic combination lock and a door strike solenoid, said electronic circuit comprising:

a first operational amplifier having a positive input, a negative input, and an output;

an antenna having an output connected to the positive input of said first operational amplifier;

the parallel combination of a first resistor, a first capacitor, and a first diode connected between ground and the positive input of said first operational amplifier;

said first diode having a cathode connected to the positive input of said first operational amplifier and an anode connected to ground;

a second operational amplifier having a positive input connected to the output of said first operational amplifier, a negative input and an output;

a second diode having an anode connected to the output of said second operational amplifier and a cathode;

a third operational amplifier having a positive input connected to the cathode of said second diode, a negative input and an output;

the parallel combination of a second resistor and a second capacitor connected between ground and the positive input of third operational amplifier;

a transistor having a base connected to the output of said third operational amplifier, an emitter connected to ground and a collector;

a direct current voltage source having an output connected to the negative inputs of said second and third operational amplifiers and the collector of said transistor;

a first relay having a normally closed contact and a coil with one end of said coil being connected to the collector of said transistor;

the contact of said first relay having a common terminal connected to ground, a normally closed terminal and a normally open terminal;

a third diode a cathode connected to the opposite end of the coil of said first relay and an anode;

a voltage regulator having an input connected to said electronic combination lock and an output connected to the anode of said third diode;

a second relay having a normally open contact and a coil with one end of said coil being connected to the normally closed terminal of the normally closed contact of said first relay and the opposite end said coil being connected to the output of said voltage regulator;

the contact of said second relay having a common terminal connected to said door strike solenoid and a normally open terminal connected to said electronic combination lock; and first and second variable resistors, said first variable resistor being connected between the output of said voltage source and the negative input of said second operational amplifier and said second variable resistor being connected between the output of said voltage source and the negative input of said third operational amplifier.

9. The circuit of claim 8 further characterized by an analog meter connected to the output of said first operational amplifier.

10. The circuit of claim 8 wherein said direct current voltage source comprises:
a voltage regulator having an input and an output;
a third capacitor connected to the input of said voltage regulator;
a fourth capacitor connected to the output of said voltage regulator;
a fourth diode having a cathode connected to the output of said voltage regulator and an anode;
a fifth diode having a cathode and an anode connected to the anode of said forth diode; and
a direct current battery having a positive terminal connected to the anode of said fifth diode.

11. The circuit of claim 8 further characterized by a light emitting diode having an anode connected to the output of said voltage source and a cathode connected to the collector of said transistor.

12. An electronic circuit for use with an electronic control unit having an output and a door strike solenoid having an input, said electronic circuit being connected between the output of said electronic control unit and the input of said door strike solenoid for preventing said door strike solenoid from being falsely energized by an electrical signal supplied thereto by said electronic control unit, said electronic control unit supplying said electrical signal in response to radio frequency signals generated by a transmitter located near said electronic control unit, said electronic circuit comprising:

an antenna for receiving said radio frequency signals;

a radio frequency detector circuit having an input connected to said antenna and an output for converting said radio frequency signals to a first direct current voltage signal having an amplitude indicative of the field strength of said radio frequency signals;

a threshold adjust circuit having an output for providing a reference direct current voltage signal;

a lockout time adjust circuit having an output for generating a second direct voltage signal having a variable amplitude;

a comparator circuit having a first input connected to the output of said radio frequency detector circuit, a second input connected to the output of said threshold adjust circuit, a third input connected to the output of said lockout time adjust circuit and an output for producing a third direct current voltage signal whenever the amplitude of said first direct current voltage signal exceeds said reference direct current voltage signal, said comparator circuit maintaining said third direct current voltage for a variable time period after the amplitude of said first direct current voltage signal becomes less than said reference direct current voltage signal with the duration of the time period at which said comparator circuit maintains said third direct current voltage signal being proportional to the amplitude of said second direct current voltage signal;

a switching transistor having a base connected to the output of said comparator circuit, an emitter connected to ground and a collector; and a relay circuit having at least one relay, said relay having a coil with one end of said coil being connected to the output of said electronic control unit and the opposite end of said coil being connected to he collector of said switching transistor and a normally closed contact connected between the output of said electronic control unit lock and the input of said door strike solenoid, the coil of said relay circuit being energized by the electrical signal from said electronic control unit when said switching transistor is turned on by the third direct current voltage signal from said comparator circuit, the normally closed contact of said relay circuit being opened by said energized coil thereby preventing the electrical signal from said electronic control unit from falsely energizing said door strike solenoid.

13. The circuit of claim 12 further characterized by an analog meter connected to the output of said radio frequency detector circuit.

14. The circuit of claim 12 further characterized by an indicator light connected to the collector of said switching transistor.

* * * * *